United States Patent [19]

Toyoda et al.

[11] Patent Number: 4,697,430
[45] Date of Patent: Oct. 6, 1987

[54] AIR CONDITIONER WITH A RADIANT TEMPERATURE CONTROL

[75] Inventors: Keiji Toyoda; Sei Suma, both of Fuji, Japan

[73] Assignee: Kabushiki Kaisha Toshiba, Kawasaki, Japan

[21] Appl. No.: 868,682

[22] Filed: May 30, 1986

[30] Foreign Application Priority Data

May 31, 1985 [JP] Japan .................................. 60-118127
Sep. 30, 1985 [JP] Japan .................................. 60-216849

[51] Int. Cl.$^4$ ............................................. G05D 23/00
[52] U.S. Cl. ................................... 62/209; 236/91 C; 236/91 D
[58] Field of Search ................... 62/209, 208, 203; 236/91 C, 91 G, 91 D, 91 E, 91 F; 165/28

[56] References Cited

U.S. PATENT DOCUMENTS

| | | | |
|---|---|---|---|
| 2,917,702 | 12/1959 | Steghart et al. | 165/28 X |
| 4,024,725 | 5/1977 | Uchida et al. | 236/91 G X |
| 4,291,749 | 9/1981 | Ootsuka et al. | 165/43 X |
| 4,337,821 | 7/1982 | Saito | 165/28 X |
| 4,344,565 | 8/1982 | Kojima et al. | 236/91 C X |

FOREIGN PATENT DOCUMENTS 57-210232  5/1984  Japan .

Primary Examiner—Harry Tanner
Attorney, Agent, or Firm—Cushman, Darby & Cushman

[57] ABSTRACT

An air conditioner with a radiant temperature control comprises a refrigeration cycle for air-conditioning a room to be air conditioned at a desired temperature, a temperature setting section for generating set data for setting the desired temperature as a target value, a first temperature sensor section for detecting a room temperature of the room to be air-conditioned, a second temperature sensor section for detecting a radiant temperature of the room to be air-conditioned, a control section for receiving the set data from the temperature setting section and detection data from the first temperature sensor section and for generating an operation control signal to the refrigeration cycle in accordance with the difference therebetween, and a correcting section for receiving the set data from the temperature setting section and detection data from the second temperature sensor section and, when the difference therebetween deviates from a predetermined value, correcting the set data from the temperature setting section in accordance with the deviation of the difference between the set data and the detection data from the predetermined value.

5 Claims, 12 Drawing Figures

AIR CONDITIONER WITH A RADIANT TEMPERATURE CONTROL

BACKGROUND OF THE INVENTION

This invention relates to an air conditioner with a radiant temperature control and, more particularly, to an air conditioner using a heat pump type refrigeration cycle.

In air conditioners with a heat pump type refrigeration cycle, a four-way valve, an outdoor heat exchanger, a pressure reducing unit, and an indoor heat exchanger are connected in series to a compressor. Some air conditioners of this type control a room's temperature using a radiant temperature from a wall or floor of the room (or air-conditioning space).

Conventionally, the input port of a control circuit used in such an air conditioner is connected to a room temperature sensor for detecting the room temperature and to a radiant temperature sensor for detecting the radiant temperature from a wall or floor of the room. The output port of the control circuit is connected to a compressor constituting a refrigeration cycle. The control circuit compares the room and radiant temperatures. As a difference between the two temperatures increases, the compressor output is increased; and as the difference decreases, the compressor output is decreased. Alternatively, a target temperature preset by a temperature setting means is corrected in accordance with the difference.

In this system, however, the radiant temperature varies less than the room temperature. Therefore, ideal air-conditioning cannot always be performed with the above system.

For example, when a defrosting cycle starts during a heating operation or someone opens a window in the room abruptly, the room temperature changes greatly and the person in the room perceives that it is cold due to the temperature change. However, the heat capacity of the wall or floor is large, and the radiant temperature varies less than the room temperature. Therefore, the control circuit erroneously determines that the room has a high relative radiant temperature and controls the compressor in accordance therewith. More specifically, when the temperature is stable, a difference between the room and radiant temperatures in a specific period of time defined as $\Delta T1$, at which a comfortable temperature is maintained. In the next period of time, if defrosting is started or someone opens a window abruptly, the room temperature is greatly changed, and the difference between the room and radiant temperatures is decreased to $\Delta T2$ ($\Delta T1 > \Delta T2$). The room temperature is thus decreasd, resulting in a low perceived temperature. However, it is determined that the apparent radiant temperature is increased, and the target temperature is decreased in accordance with this determination.

In addition, the above air conditioner performs temperature control in the same manner for both cooling and heating operations. However, since people wear different amounts of clothing in summer and winter, temperatures perceived in those two seasons are different, even when temperatures vary in the same range. An increase in room temperature of one degree is perceived as a greater temperature increase during the summer than it is during the winter. When target temperature is corrected to correspond to the radiant temperature in the same manner during both cooling and heating operations, the resultant perceived room temperatures are different, thereby disabling comfortable air conditioning. In other words, when the target temperature is increased by one degree during a cooling operation, users perceive the temperature to be higher than the actual temperature increase.

SUMMARY OF THE INVENTION

It is, therefore, an object of the present invention to provide a new and improved air conditioner with a radiant temperature control which constantly performs comfortable air conditioning through temperature control in accordance with a user-perceived temperature.

It is another object of the present invention to provide an improved air conditioner which eliminates a difference in perceived temperatures in summer and winter or in cooling and heating operations caused by a difference in radiant temperatures and which operates through temperature control capable of providing more comfortable air conditioning.

According to the present invention, there is provided an air conditioner with a radiant temperature control comprising:

a refrigeration cycle for air-conditioning a room to be air conditioned at a desired temperature;

temperature setting means for generating set data for setting the desired temperature as a target value;

first temperature sensor means for detecting a room temperature of the room to be air-conditioned;

second temperature sensor means for detecting a radiant temperature of the room to be air-conditioned;

control means for receiving the set data from the temperature setting means and detection data from the first temperature sensor means, and for generating an operation control signal to the refrigeration cycle in accordance with a difference therebetween; and correcting means for receiving the set data from the temperature setting means and detection data from the second temperature sensor means and, when a difference therebetween deviates from a predetermined value, correcting the set data from the temperature setting means in accordance with a deviation of the difference between the set data and the detection data and the predetermined value.

BRIEF DESCRIPTION OF THE DRAWINGS

These and other objects and features of the present invention can be understood by reference to the accompanying drawings, in which.

DETAILED DESCRIPTION OF THE PREFERRED EMBODIMENTS

The first embodiment of the present invention will be described in detail with reference to FIGS. 1 to 5.

Figure 1:
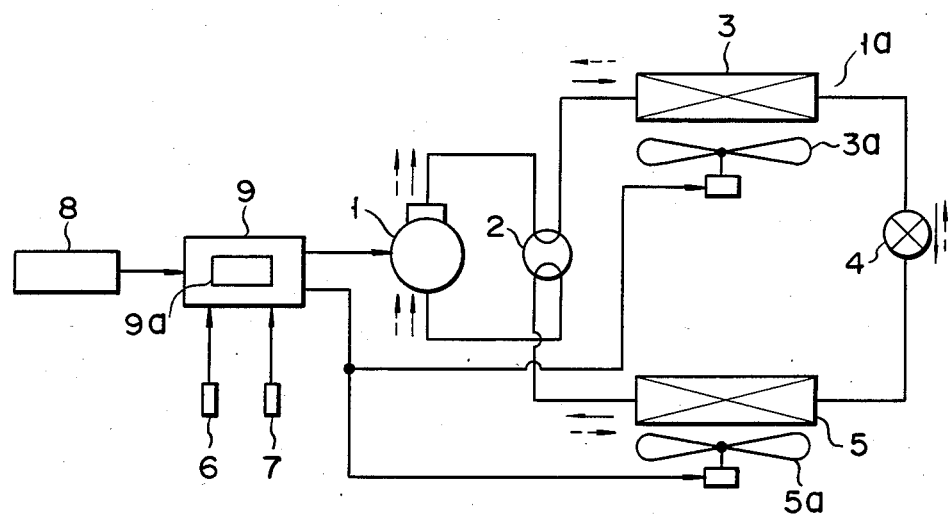
FIG. 1 schematically shows a configuration of an air conditioner according to a first embodiment of the present invention.

FIG. 1 shows a schematic configuration of an air conditioner having compressor 1 whose output is variable, four-way valve 2, outdoor heat exchanger 3 with outdoor fan 3a, pressure reducing unit 4, and indoor heat exchanger 5 with indoor fan 5a. Valve 2, exchanger 3, unit 4, and exchanger 5 are serially connected to compressor 1, thereby constituting a heat pump type refrigeration cycle 1a, capable of both cooling and heating operations. Room temperature sensor 6 detects the temperature of the room (or air-conditioning space). Radiant temperature sensor 7 detects the temperature of radiant energy emitted from a wall or floor of the room. Operation section 8 selects an operation mode between cooling and heating operations and sets a target temperature. Control circuit 9 comprises a microcomputer and correction circuit 9a. Sensors 6 and 7 and section 8 are connected to the input port of circuit 9 to respectively supply target temperature TS set by section 8, room air temperature TA detected by sensor 6, and radiant temperature TR detected by sensor 7 thereto.

Circuit 9 generates an instruction to change the output of compressor 1 in accordance with a difference between input temperatures TS and TA. A memory section of circuit 9 stores the difference between temperatures TS and TR at which a most-comfortable air-conditioning state is obtained in the form of predetermined value $\Delta T1$. Circuit 9 also performs the function of correction circuit 9a. When the actual difference between temperatures TS and TR is larger than value $\Delta T1$, circuit 9a shifts initial target temperature TS, previously supplied, up (plus $\alpha$). When the difference is smaller than value $\Delta T1$, circuit 9a shifts initial target temperature TS down (minus $\alpha$). Namely, while circuit 9 corrects temperature TS through circuit 9a in accordance with the comparison difference of value $\Delta T1$ and the actual difference between temperatures TS and TR, it generates an instruction to cause temperature TA to reach corrected target temperature TS.

Figure 2:
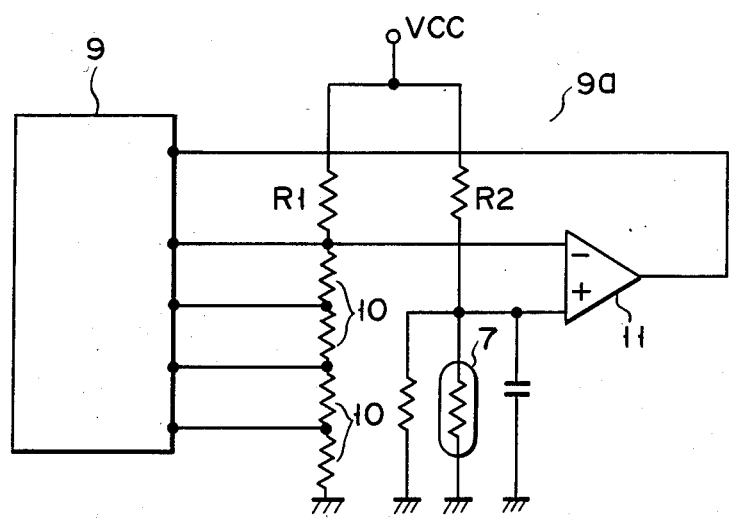
FIG. 2 is a circuit diagram of a correction circuit of FIG. 1 for correcting a target temperature.
Figure 3:
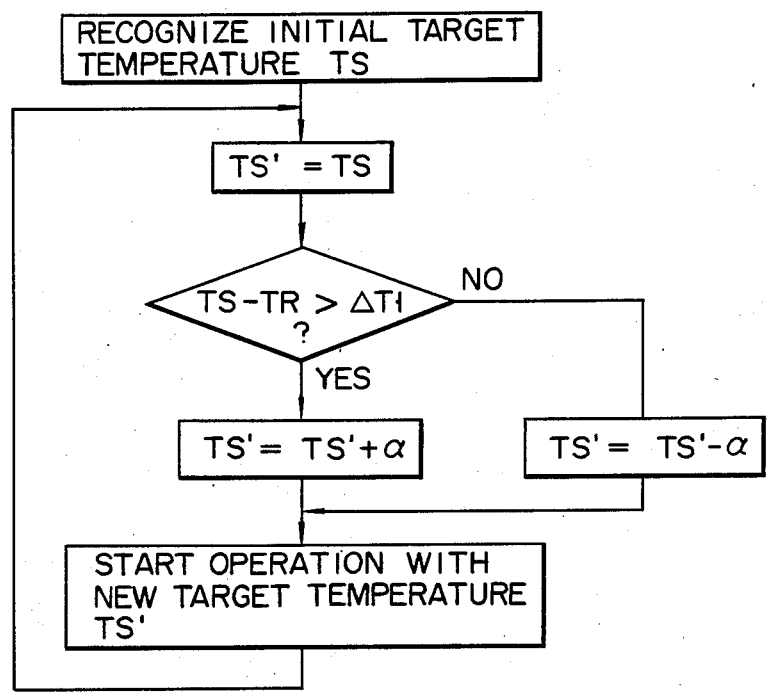
FIG. 3 is a flow chart of a target temperature correction control of the first embodiment of the present invention.

As a practical circuit 9a for correcting temperature TS, the circuit as shown in FIG. 2 is used. More specifically, comparison resistor group 10, comprising a plurality of comparison resistors in units of target temperatures, is connected in series to power source Vcc through bias resistor R1. Individual comparison resistors are connected separately to ports of circuit 9 which output predetermined timing signals. Outputs of group 10 are connected to one input terminal (−) of comparator 11. The other input terminal (+) of comparator 11 is connected to source Vcc through bias resistor R2 and, simultaneously, to sensor 7. The output terminal of comparator 11 is connected to a predetermined port of circuit 9. Comparator 11 compares a voltage output from sensor 7 and that from any resistor node of group 10, which is selected in accordance with temperature TS. The deviation of the difference between the two voltages from value $\Delta T1$ is then supplied to circuit 9. When the difference signal is larger than value $\Delta T1$, a resistor node of group 10 which produces an output voltage higher than that of the node selected by circuit 9 by one stage is selected, and the corresponding target temperature is set as new target temperature TS. When the difference signal is smaller than value $\Delta T1$, another node of group 10 which produces an output voltage lower than that of the node selected by circuit 9 by one stage is selected, and the corresponding target temperature is set as new target temperature TS. In short, temperature TS is corrected in accordance with the current deviation from value $\Delta T1$.

The output terminal of circuit 9 is connected to a motor of compressor 1, when constitutes cycle 1a along with fans 3a and 5a so that the operation of cycle 1a is controlled in accordance with the instruction supplied from circuit 9. The operation of the air conditioner with the above configuration will be described with reference to the flow chart of FIG. 3.

First, the heating mode and temperature TS are set by section 8, and operation is started. Set temperature TS is recognized and stored in circuit 9. In this case, valve 2 is switched to the heating mode side. Then the difference between temperature TS and temperature TA detected by sensor 6 is detected by circuit 9, and the rotational frequencies of compressor 1 and fans 3a and 5a are controlled in accordance with the difference, thereby setting output of the air conditioner in accordance with the load. The heating cycle is then performed in accordance with the load.

When the above operation is started, temperatures TA and TR are increased. The operation of compressor 1 is controlled so that temperature TA is equal to temperature TS and so that temperature TR is lower than temperature TS by value $\Delta T1$, thereby maintaining a comfortable air-conditioning temperature.

During heating operation, assume that defrosting is started or that someone opens the window. Thereafter, temperature TA varies to become greater than temperature TR, as indicated in region Y in FIG. 4. Conventionally, it is erroneously determined in this case that temperature TR is relatively high, and temperature TS is subsequently decreased. However, according to the first embodiment of the present invention, the difference (TS−TR) between temperature TR detected by sensor 7 and the initial target temperature TS is calculated during operation of the air conditioner, and it is constantly monitored whether the difference is maintained at value $\Delta T1$.

Figure 4:
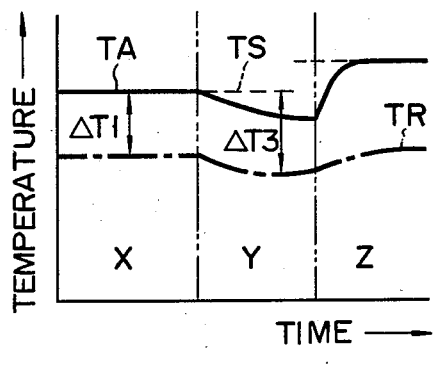
FIG. 4 is a graph showing changes in temperature when the target temperature is corrected in accordance with a decrease in room temperature according to the first embodiment of the present invention.

When defrosting is started or someone opens the window, temperature TR is decreased as indicated in region Y in FIG. 4, and the difference becomes $\Delta T3$, which is larger than value $\Delta T1$ ($\Delta T3 > \Delta T1$). A signal representing this increase is then fed back to circuit 9, and a node of group 10, which is shifted up (plus $\alpha$) by one stage from the node stage corresponding to initial target temperature TS is selected. In other words, correction is made to increase temperature TS to correct the low perceived temperature. Corrected target temperature TS' is then stored in circuit 9 in place of initial target temperature TS previously set by section 8. Outputs of compressor 1 and fans 3a and 5a are controlled in accordance with the new temperature TS', and the heating operation continues. More specifically, as indicated in region Z in FIG. 4, temperatures TA and TR are increased, and the room is heated in accordance with the perceived temperature. Conversely, when the difference is lower than value ΔT1 and the perceived temperature is high, temperature TS is shifted down (minus α) by one stage to temperature TS', and the outputs of compressor 1 and fans 3a and 5a are decreased, thereby performing an energy-saving operation. The above correction (shift up, shift down) is repeated to perform comfortable air-conditioning.

Figure 5:
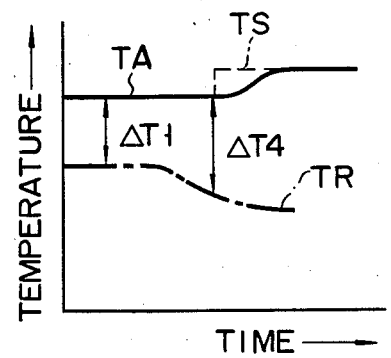
FIG. 5 is a graph showing changes in temperature when the target temperature is corrected in accordance with a decrease in radiant heat temperature according to the first embodiment of the present invention.

When the outdoor temperature is decreased and the temperature of the wall or floor of the room, i.e., temperature TR, is also decreased, resulting in a low perceived temperature, similar control is performed. More specifically, as shown in FIG. 5, correction is made to shift temperature TS up in accordance with difference value ΔT4, which is larger than value ΔT1 (ΔT4>ΔT1). Thereafter, the operation of compressor 1 is controlled to compensate for the low perceived temperature, so that refrigeration cycle 1a is performed in accordance with the perceived temperature. In this manner, even if temperature TA varies, an adequate heating operation can be constantly performed in accordance with the perceived temperature.

Figure 6:
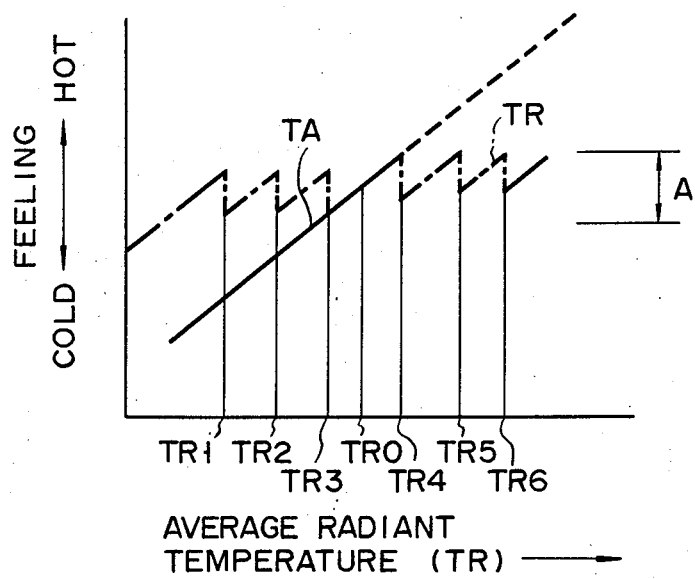
FIG. 6 is a graph showing changes in temperature when the target temperature is corrected using a plurality of fine shift steps according to a modification of the first embodiment of the present invention.

As shown in FIG. 6, shift steps (TR1 to TR6) with predetermined fine up and down shifts can be set in circuit 9, and temperature TS can be finely adjusted in accordance with the shift steps. More specifically, assume that the radiant temperature is TR0 and a comfortable heating state is obtained at room temperature TA. When the radiant temperature is slightly increased to TR4, the difference between the target temperature and the radiant temperature is smaller than predetermined value ΔT1. Therefore, target temperature TS is shifted down (minus α) to slightly lower temperature TS'. When the radiant temperature is again slightly increased from TR4 to TR5 with corrected temperature TS', the target temperature is shifted down (minus α) to further lower temperature TS'. When these fine shifts down are repeated, fine temperature control in accordance with the perceived temperature can be performed. Conversely, when temperature TR is decreased, temperature TS is finely shifted up (plus α). In this manner, correction of temperature TS can be finely controlled in accordance with the perceived temperature. Moreover, variations in the perceived temperature due to shifts up and down are small. Therefore, such correction allows a wide radiant temperature range A to provide the same degree of air-conditioning comfort.

Although the above description exemplifies heating, it is apparent that cooling can be performed, with adequate temperature control, in the same manner.

In short, according to the first embodiment of the present invention, the initial target temperature is corrected in accordance with a differenc between the initial target temperature and the radiant temperature. Therefore, the refrigeration cycle can be correctly performed even when the room temperature varies. Consequently, according to the first embodiment of the present invention, even when the room temperature varies, an adequate air conditioning operation can be constantly performed in accordance with the perceived temperature.

A second embodiment of the present invention will be described in detail with reference to FIGS. 7 to 11.

Figure 7:
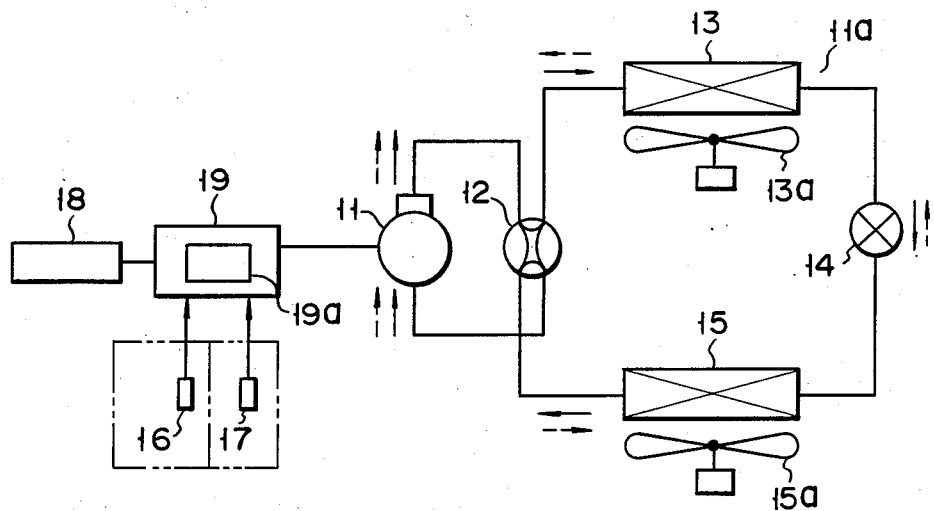
FIG. 7 is a block diagram of an air conditioner according to a second embodiment of the present invention.

In FIG. 7, compressor 11 of an air conditioner with a heat pump type refrigeration cycle has a variable output inverter. When compressor 11 is operated during a cooling operation, a high-temperature, high-pressure refrigerant compressed by compressor 11 is supplied to outdoor heat exchanger 13, which is cooled by outdoor fan 13a, in the direction indicated by a solid arrow in FIG. 7, i.e., supplied through four-way valve 12, is heat-exchanged by exchanger 13, and is liquefied. The refrigerant is then depressurized by pressure reducing unit 14, is heat-exchanged with indoor heat exchanger 15 with indoor fan 15a, and is used to cool the room. Used refrigerant is returned to compressor 11 through valve 12.

In the heating operation, valve 12 is switched to drive compressor 11. The refrigerant of compressor 11 is supplied to exchanger 15 through valve 12 in the direction indicated by a broken arrow in FIG. 7 and is heat-exchanged to heat the room. Used refrigerant is depressurized by pressure reducing unit 14, heat-exchanged by outdoor heat exchanger 13 with outdoor fan 13a, and is returned to compressor 11 through valve 12.

Room temperature sensor 16 for detecting the room temperature and radiant temperature sensor 17 for detecting the radiant temperature of a wall or floor of the room are arranged in the room in the air-conditioned space. Sensors 16 and 17 are connected to input ports of control circuit 19, together with operation section 18, which is used to select the cooling/heating mode and a target temperature.

More specifically, circuit 19 comprises a microcomputer as correction circuit 19a and performs the same function as that of the first embodiment. The output port of circuit 19 is connected to compressor 11. Circuit 19 corrects the target temperature set by operation section 18 in accordance with the difference between the target temperature and the temperature detected by sensor 17 in the same manner as the first embodiment. In this case, the difference in perceived temperatures during cooling and heating operations in summer and winter is corrected in a manner to be described below.

In order to achieve correction, data representing target temperature TS (see FIGS. 8A, 8B and 9) set by operation section 18, room temperature TA detected by sensor 16, and radiant temperature TR detected by sensor 17 is suplied to circuit 19. Circuit 19 supplies instructions to change the output of compressor 11 in accordance with the difference between input target temperature TS and room temperature TA. A memory section of circuit 19 stores, as predetermined value ΔT1, the difference between temperature TS and TR to provide comfortable air-conditioning. When a current difference therebetween is larger than value ΔT1, initial target temperature TS is shifted up (plus α). On the other hand, when the current difference is smaller than value ΔT1, initial target temperature TS is shifted down (minus α). Circuit 19 also supplies instructions to cause temperature TA to reach corrected target temperature TS' while correcting temperature TS in accordance with deviation of the above difference from value ΔT1. The functions of circuit 19 are thus similar to those of circuit 9 in the first embodiment.

When the radiant temperature of the room is high, as in summer, circuit 19 lowers temperature TS. When the radiant temperature of the room is low, as in winter, circuit 19 raises temperature TS. In this manner, the perceived temperature difference in cooling in summer and heating in winter can be corrected.

The operation of the air conditioner with the above functions according to the second embodiment of the present invention will be described with reference to the flow charts of FIGS. 8A and 8B and the temperature difference correction graphs of heating and cooling operations of FIGS. 9 and 10.

Figure 8A:
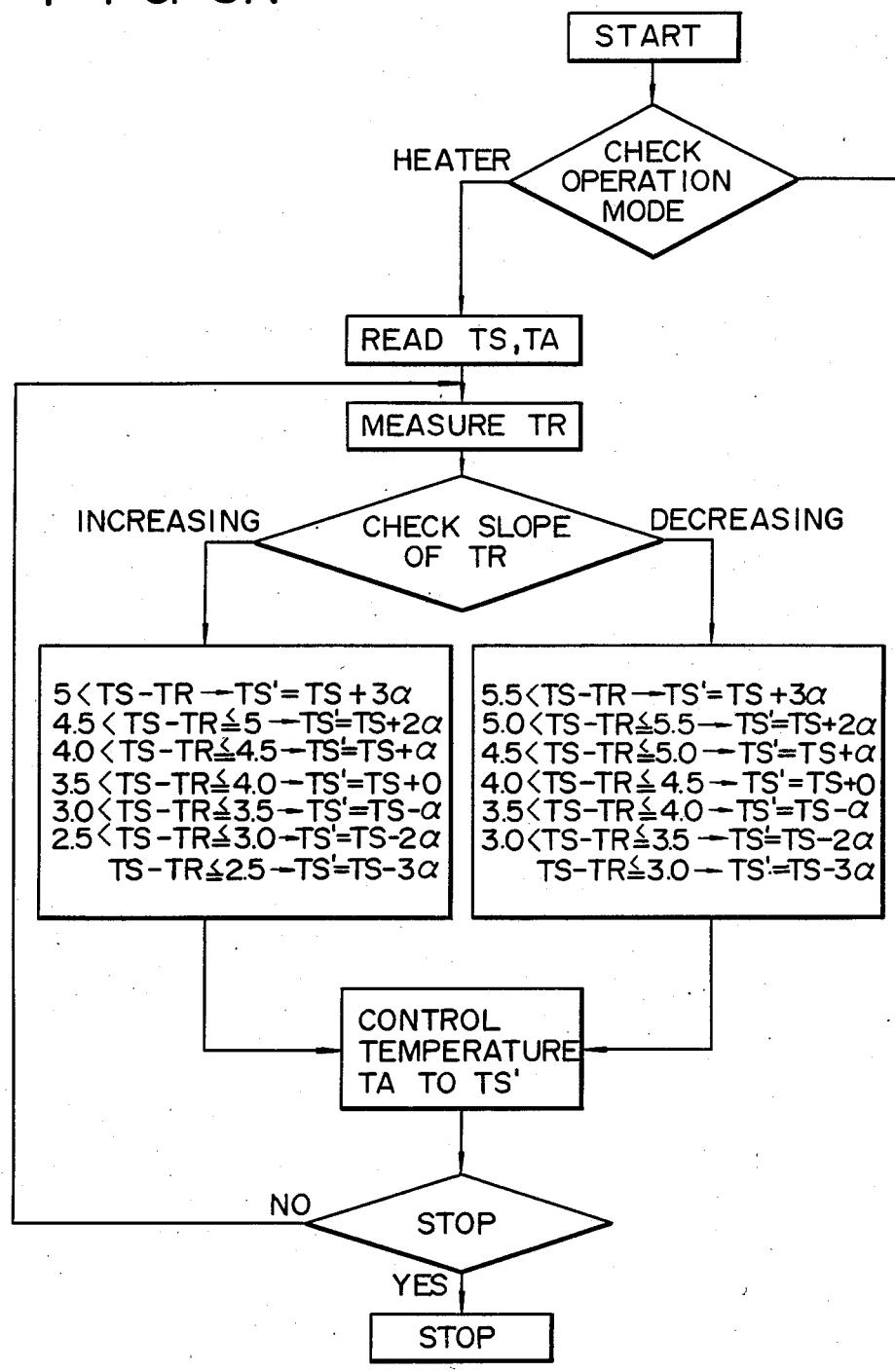
FIGS. 8A and 8B are flow charts for explaining the operation of the second embodiment of the present invention.
Figure 9:
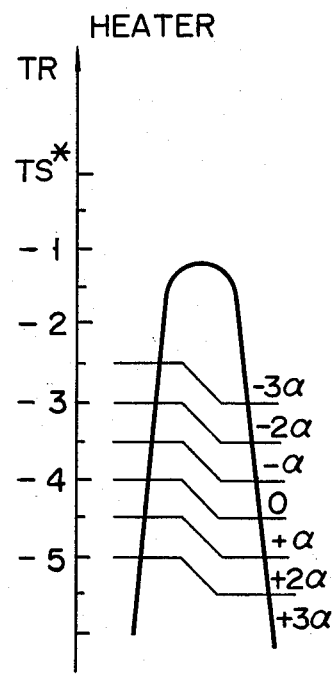
FIGS. 9 and 10 are graphs of temperature difference correction control in the cooling and heating operations according to the second embodiment of the present invention.

In the heating operation, the flow chart in FIG. 8A is executed. First, the heating operation is set by section 18 and operation is started. In doing so, initial target temperature TS is recognized and stored in circuit 19. Valve 12 is switched to the heating mode. Circuit 19 detects the difference between temperature TS and temperature TA detected by sensor 16 and controls the rotational frequencies of compressor 1 and fans 13a and 15a in accordance with the detected difference, thereby setting the output of the air conditioner in accordance with the load. Thereafter, the heating cycle is started in accordance with the load. In this manner, the heating cycle is started and temperature TA and radiant temperature TR of the wall or floor of the room increase. Temperature TR is then detected by sensor 17. Circuit 19 checks the slope of increasing or decreasing temperature TR, as indicated by the graph for the heating operation in FIG. 9. Circuit 19 performs the predetermined operation shown in FIG. 8A, depending on the increasing or decreasing temperature slope, in order to obtain corrected target temperature TS′ in accordance with the difference (TS−TR) between temperatures TS and TR. Next, room temperature TA is corrected to temperature TS′.

Figure 8B:
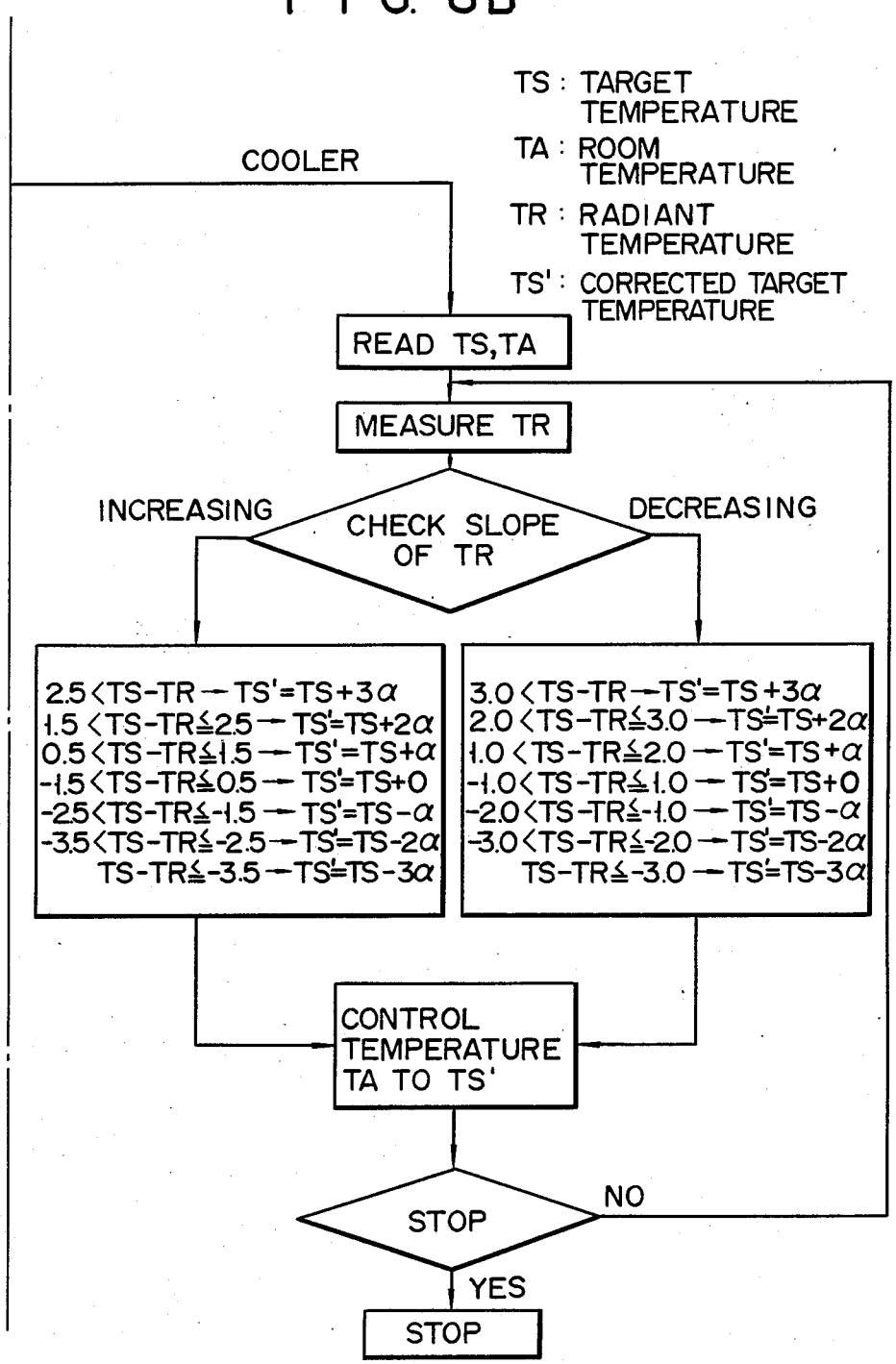
Figure 10:
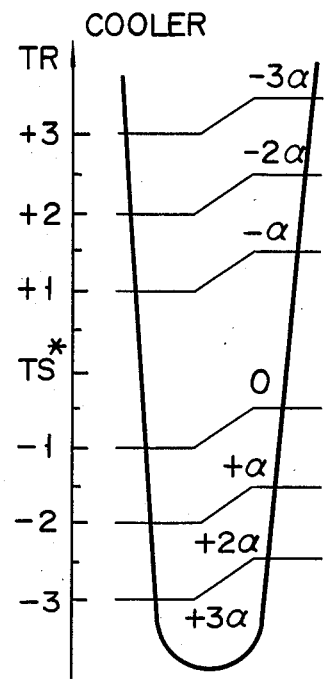

In the cooling operation, as shown by the flow chart in FIG. 8B and the graph for the cooling operation in FIG. 10, temperature control is performed to set temperature TA to temperature TS′. In this manner, when the radiant temperature of the room is high, circuit 19 lowers temperature TS to temperature TS′ in accordance with the perceived temperature. When the radiant temperature of the room is low, circuit 19 raises temperature TS to temperature TS′. In this case, the correction amount varies in the cooling and heating operations, as shown in FIGS. 8A and 8B. The perceived temperature difference in the cooling and heating operations is thus corrected.

For example, when temperature TS is raised by 1° C. in the cooling operation, conventionally, the perceived temperature is increased. However, with circuit 19 according to the second embodiment of the present invention, target temperature TS is changed to corrected target temperature TS′ to eliminate the perceived temperature difference, thereby providing air-conditioned comfort.

Figure 11:
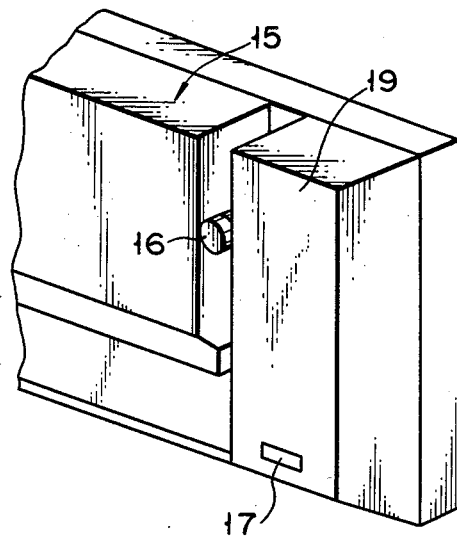
FIG. 11 shows an example of an arrangement for mounting the air conditioner according to the second embodiment of the present invention.

FIG. 11 shows an example of a method of mounting the air conditioner of the second embodiment. Control circuit 19, constituting a control panel, is provided on a side of the front portion of indoor exchanger 15, and indoor temperature sensor 16 and radiant temperature sensor 17 are arranged in the vicinity thereof. With this structure, adverse influences of the thermal energy generated by circuit 19 are eliminated, and sensors 16 and 17 can correctly detect the room and radiant temperatures.

As described above, according to the second embodiment of the present invention, an air conditioner with a heat pump type refrigeration cycle has sensor 16 for detecting a room temperature, sensor 17 for detecting a radiant temperature of the room, operation section (temperature setting means) 18 for setting a target temperature, and control circuit 19 for correcting the target temperature set by section 18 in accordance with the temperatures detected by sensors 16 and 17. The air conditioner corrects a perceived temperature difference during a cooling operation in summer or a heating operation in winter. The perceived temperature difference caused by the radiant temperature in both coolling and heating operations can thus be eliminated. In addition, even when the room temperature varies, air conditioned comfort can be provided with an energy-saving operation.

What is claimed is:

1. An air conditioner with a radiant temperature control comprising:
 a refrigeration cycle for air-conditioning a room at a desired temperature;
 temperature setting means for setting the desired temperature at a target value;
 first temperature sensor means for detecting an air temperature of the room;
 second temperature sensor means for detecting a radiant temperature of the room;
 control means for receiving the target value from said temperature setting means and the air temperature from said first temperature sensor means and for outputting an operation control signal to said refrigeration cycle in accordance with a difference between said target value and said air temperature; and
 correcting means for receiving the target value from said temperature setting means and the radiant temperature from said second temperature sensor means, and when a difference therebetween deviates from a predetermined value, correcting the target value from said temperature setting means in accordance with a deviation of the difference between the target value and the radiant temperature from the predetermined value.

2. An air conditioner according to claim 1, wherein the predetermined value is selected such that a temperature deviation is not perceived by a person within the room.

3. An air conditioner according to claim 1, wherein said correcting means corrects the target value from said temperature setting means by shifting the target value to a new target value which is a predetermined number of shift steps from said target value, each shift step corresponding to a predetermined temperature increment.

4. An air conditioner with a radiant temperature control comprising:
 a heat exchange cycle for air-conditioning a room at a desired temperature in a cooling or heating mode;
 operating means for setting said heat exchange cycle in the cooling or the heating mode and for setting the desired temperature at a target value;
 first temperature sensor means for detecting an air temperature of the room;
 second temperature sensor means for detecting a radiant temperature of the room;
 control means for receiving the target value from said operating means and the air temperature from said first temperature sensor means and for outputting an operation control signal to said heat exchange cycle in accordance with a difference between said target value and said air temperature; and correcting means for receiving the target value from said operating means and the radiant temperature from said second temperature sensor means and, when a difference therebetween deviates from a predetermined value, correcting the target value from said operating means in accordance with a deviation of the difference betwen the target value and the radiant temperature from the predetermined value and in accordance with the cooling or heating mode set in said heat exchange cycle.

5. An air conditioner according to claim 4, wherein said first and second temperature sensors are arranged so as to cancel adverse influences of heat generated by said control means.

* * * * *